UNITED STATES PATENT OFFICE.

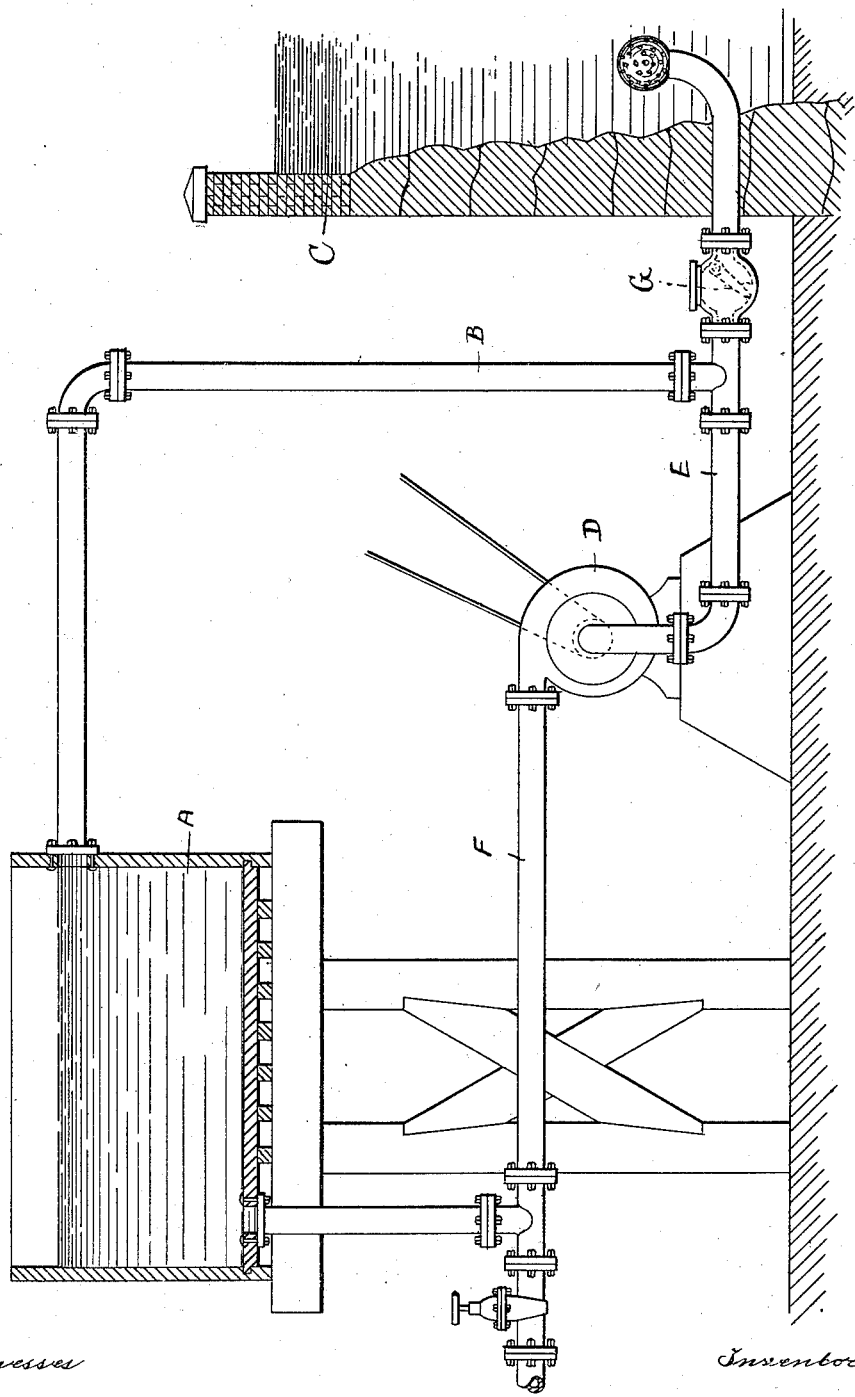

GEORGE I. ROCKWOOD, OF WORCESTER, MASSACHUSETTS.

APPARATUS FOR MAINTAINING THE WATER-LEVEL IN RESERVOIRS.

SPECIFICATION forming part of Letters Patent No. 686,341, dated November 12, 1901.

Application filed June 3, 1901. Serial No. 62,890. (No model.)

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Apparatus for Maintaining the Water-Line in Tanks or Reservoirs, of which the following is a specification, accompanied by a drawing representing an apparatus embodying my invention, in which—

A denotes an elevated tank or reservoir in which it is desired to maintain a supply of water upon the water-line A'.

B denotes an overflow-pipe communicating with the water-tank at the desired level of the water-line.

C denotes the water-supply; D, a pump from which water is drawn from the water-supply through the pipe E and forced through the pipe F into the bottom of the tank A.

G denotes a check-valve in the pipe E, which permits the water to flow from the water-supply C to the pump D, but prevents its return.

The pump D may be of any suitable or known form of pump now in use, but is represented in the accompanying drawing as a centrifugal or rotary pump.

As the body of water in the water-supply C is at a higher level than the pipe E and pump D, water will be supplied to the pump and connected pipes by gravity, and the action of the pump will serve to lift the water above the level of the water-supply and force it into the tank A, which is elevated above the source of water-supply. When the water in the tank A reaches the level of the overflow-pipe B, any excess of water pumped into the tank will flow through the pipe B, which communicates with the pipe E between the pump D and check-valve G. When the pipe B is filled with water, its pressure against the check-valve G will be greater than the pressure of the water in the water-supply, thereby closing the check-valve G, so that the action of the pump will draw its supply from the pipe B and force the overflow-water from the tank A through the pipe F back into the tank, maintaining a circulation of water from the tank A through the pipes B and F back into the tank. If the water in the tank be drawn down below the overflow-pipe B, so that a column of water in the pipe B is no longer maintained of greater pressure than the water in the water-supply C, the pump will resume taking water from the water-supply C and force it into the tank A until the level of the overflow-pipe is again reached. By this means the pump is made to force water from the water-supply C into the tank so long as the water in the tank is below the overflow-pipe; but whenever the water in the tank reaches the level in the overflow-pipe the check-valve G becomes closed by the pressure of the water in the pipe B, and the pump simply returns the overflow-water back to the tank.

What I claim as my invention, and desire to secure by Letters Patent, is—

1. The combination with an elevated tank, of a water-supply, a pump, pipe connections between said water-supply and said pump and between said pump and said tank, a check-valve between said water-supply and said pump, an overflow-pipe from said tank communicating with the pipe leading from said check-valve to said pump, whereby the pressure of water in said overflow-pipe is made to close said check-valve, substantially as described.

2. In an apparatus for supplying water from a source of water-supply to an elevated tank and comprising a pump and a check-valve between the pump and the source of water-supply, of a water column supplied from the overflow of said tank, the pressure of said water column being applied to close said check-valve against the pressure of the water from the source of water-supply, substantially as described.

Dated this 31st day of May, 1901.

GEORGE I. ROCKWOOD.

Witnesses:
RUFUS B. FOWLER,
FLORENCE C. COOK.